United States Patent [19]

Lu et al.

[11] Patent Number: 5,874,507
[45] Date of Patent: Feb. 23, 1999

[54] POLYEPICHLOROHYDRIN-BASED TRI-BLOCK ADDITIVE FOR SURFACE MODIFICATION OF POLYMER FILMS AND ARTICLES

[75] Inventors: Xinya Lu, Spring Valley; Eric S. Gardiner, Westtown, both of N.Y.

[73] Assignee: Arizona Chemical Company, Panama, Fla.

[21] Appl. No.: 929,992

[22] Filed: Sep. 15, 1997

Related U.S. Application Data

[62] Division of Ser. No. 787,245, Jan. 24, 1997, Pat. No. 5,721,322.

[51] Int. Cl.$^6$ .................................................. C08G 65/32
[52] U.S. Cl. ......................... 525/404; 525/403; 525/408; 530/211; 530/212; 530/215; 530/216; 530/217; 530/218; 530/223; 530/232; 560/26; 560/115; 560/128; 560/166; 560/354; 560/357; 560/358
[58] Field of Search .................................... 525/404, 408, 525/403; 530/211, 212, 215, 216, 217, 218, 223, 232; 560/128, 26, 115, 166, 354, 357, 358

[56] References Cited

U.S. PATENT DOCUMENTS 3,850,856  11/1974  Dreyfuss et al. ........................ 525/408

Primary Examiner—Frederick Krass
Attorney, Agent, or Firm—Luedeka, Neely & Graham, P.C.

[57] ABSTRACT

The specification discloses a method and additive for increasing the surface activity of non-polar polymeric materials, and a non-polar polymeric material exhibiting increased surface activity. The invention employs an additive of the formula $$A\text{-}B\text{-}A^1$$

wherein each of the A and $A^1$ blocks which may be the same or different has a number molecular weight in the range of from about 200 to about 1000 daltons and is selected from the group substituted and unsubstituted alkyl, cycloalkyl, alkenyl, cycloalkenyl, aryl and alkylaryl units derived from one or more esters, organic acids, organic halides or organic acid halides, and units derived from alkyl or aryl isocyanates or ester-amides. The B-block is a polyepichlorohydrin unit derived from a polyepichlorohydrin polyol having at least two terminal hydroxyl groups and having an average molecular weight in the range of from about 400 to about 4000 daltons. Use of the additive significantly increases the surface activity of a non-polar polymeric material for improved surface hydrophilicity, printability and coatability.

10 Claims, No Drawings

POLYEPICHLOROHYDRIN-BASED TRI-BLOCK ADDITIVE FOR SURFACE MODIFICATION OF POLYMER FILMS AND ARTICLES

This application is a division of application Ser. No. 08/787,245, filed Jan. 24, 1997, and now U.S. Pat. No. 5,721,322.

FIELD OF THE INVENTION

The present invention relates to polymers having increased surface activity (i.e., surface energy) for improved wetting, printability and coating thereof and to compositions and methods for improving the surface characteristics of polymeric materials.

BACKGROUND OF THE INVENTION

Polymeric materials such as polypropylene, low density polyethylene, alpha-olefin modified polypropylene, polystyrene, poly(4-methylpentene-1) and other organic polymeric materials having substantially non-polar characteristics are used in high volume applications in the packaging industry and are usually considered to have relatively low surface energies. These materials may be in the form of injection molded parts, free extruded films, and extrusion coatings on substrates such as paper, metal foils or non-woven fabrics. It is often desirable to modify the surface properties of these materials for special purposes such as for improved wettability, printing and coating of the polymers.

Methods for increasing the surface energies of polymeric materials are described, for example, in U.S. Pat. No. 5,272,196 to Gardiner and U.S. Pat. No. 5,281,438 to Gardiner et al. The methods described in the '196 and '438 patents employ an amphiphilic resin of the formula

$RA(CHR^2(CH_2)_nA^1)_mR_1$ wherein R and $R^1$ are selected from the group consisting of alkyl, aryl and alkylaryl groups and acyl and arylacyl derivatives of an aliphatic or aliphatic/aromatic mono-acid with a molecular weight of from about 200 to about 500 daltons, A and $A^1$ are selected from the group consisting of —O—, —S— and —$NR^{3-}$ wherein $R^2$ and $R^3$ are selected from the group consisting of H, $CH_3$ and $C_2H_5$, n is an integer from 0 to 3 and m is an integer from 2 to 20. The resin is blended with a non-polar polymeric material to increase the surface energy of the material.

U.S. Pat. No. 4,604,425 to Ohmura et al. describes modification of the surface of a polymeric material by adding a peroxy or azo derived diblock copolymer to the polymeric material. According to the '425 patent, the diblock copolymer must have at least two peroxy bonds in the molecule in order to be effective. However, it is well known that diblock copolymers are not effective surface modification agents for polymeric materials because they tend to form micelles in the host polymeric material. The micelles inhibit the migration of the hydrophilic portions of the copolymer to the surface of the host material. Under carefully controlled laboratory conditions the hydrophilic ends of the copolymers can be made to migrate to the surface to a limited degree. However, such conditions are largely impractical for commercial applications.

It is therefore an object of the invention to provide compositions for modifying the surface properties of polymeric materials, especially non-polar polymers.

It is another object of the present invention to provide a non-polar polymer which exhibits enhanced hydrophilicity and wettability.

Another object of the invention is to provide a non-polar polymeric material exhibiting improved printability and coatability using a range of inks and coatings heretofore difficult to apply to such materials.

A further object of the invention is to provide an additive for a non-polar polymeric material which is adaptable in a range of embodiments to tailor the polymer for various end use applications.

Still another object of the invention is to provide an additive for a non-polar polymeric material which is relatively simple and inexpensive to manufacture and which is readily incorporated into the polymer materials.

THE INVENTION

With regard to the above and other objects, the invention provides a method and additive for modifying the surface properties of a polymeric material. According to the method, surface properties of the polymer are modified by incorporating from about 0.1 to about 10% by weight of a triblock copolymer additive having the structure

$A\text{-}B\text{-}A^1$ wherein each of the A and $A^1$ blocks which may be the same or different has a number average molecular weight in the range of from about 200 to about 1000 daltons and is selected from the group consisting of substituted and unsubstituted alkyl, cycloalkyl, alkenyl, cycloalkenyl, aryl and alkylaryl units derived from one or more esters, organic acids, organic halides or organic acid halides, and units derived from alkyl or aryl isocyanates or ester-amides. The B-block is a polyepichlorohydrin unit derived from a polyepichlorohydrin polyol having at least two terminal hydroxyl groups and having a number average molecular weight in the range of from about 400 to about 4000 daltons.

According to another aspect of the invention, the above additive is incorporated in a non-polar polymeric material selected from the group consisting of polyolefin and polystyrene to increase the surface hydrophilicity and wettability of the material.

The invention is especially well-suited for modifying the surface properties of non-polar polymeric materials. The usefulness of the additive is particularly evident in polyolefins and polystyrenes. Preferred polyolefins include, but are not limited to, polyethylene, polypropylene, polybutylene and mixtures and derivatives thereof.

The additive may be used to modify the surface properties of a range of non-polar polymeric materials by proper selection of the compounds used to provide the A and $A^1$ blocks. The A and $A^1$ blocks are selected based on their thermodynamic compatibility with the host polymeric material. Accordingly, the A and $A^1$ blocks are preferably selected based on their solubility in the host polymer.

Preferred compounds from which the A and $A^1$ blocks may be derived are selected from the group consisting of dehydroabietic acid, abietic acid, dihydroabietic acid, tetrahydroabietic acid, pimaric acid, and palustric acid, tall oil rosin, wood rosin, hydrogenated rosin, tall oil fatty acids and mixtures and derivatives thereof including esters, halides and acid halides, and from alkyl or aryl ester-amides and alkyl or aryl isocyanates. It is also preferred that the compounds used to provide the A and $A^1$ blocks have a number average molecular weight in the range of from about 200 to about 1000 daltons. It is particularly preferred to select A and $A^1$ from tall oil rosin and tall oil fatty acid having a number average molecular weight in the range of from about 200 to about 1000 daltons, most preferably from about 250 to about 650 daltons, and that A and $A^1$ be the same.

The mid or B-block of the additive is a polyepichlorohydrin derived from a linear or branched polyepichlorohydrin (PECH) polyol teleomer having at least two terminal hydroxyl groups and having a number average molecular weight of from about 400 to about 4000 daltons. As used herein, "polyol" means two or more hydroxyl groups. Preferably the PECH compound from which the midblock is derived is a linear PECH diol having a polydispersity index of less than about 1.5.

The PECH compound may be made by polymerizing epichlorohydrin in bulk in the presence of an initiator selected to produce a teleomeric polyol and a polymerization catalyst. The initiators may be selected from the group consisting of aliphatic diols containing from about 2 to about 10 carbon atoms, preferably from about 2 to about 6 carbon atoms such as ethylene glycol, 1,3-propylenediol, 1,4-butanediol and 1,6-hexanediol. The amount of initiator present in the reaction mass used to prepare the PECH compound is determined by the following equation:

$$I/ECH = 92/M_n$$

wherein I is the moles of initiator present in the reaction mass, ECH is the moles of epichlorohydrin present in the reaction mass, and $M_n$ is the number average molecular weight in daltons of the PECH compound being made. Hence, the amount of initiator may range from about 0.03 to about 0.2 moles of initiator per mole of ECH.

The catalyst may be selected from $BF_3$ and complexes of $BF_3$ with aliphatic diols containing from about 2 to about 10 carbon atoms, preferably from about 2 to about 4 carbon atoms such as ethylene glycol, 1,3-propylenediol and 1,4-butanediol. Complexes of $BF_3$ with an aliphatic diol may be made by passing a gaseous catalyst such as $BF_3$ through the selected diol to obtain a weight increase of the diol. It is preferred that the diol be saturated with $BF_3$ which is indicated by the diol reaching a substantially constant weight as the $BF_3$ is bubbled through the diol. The complex thus formed typically has a molar ratio of $BF_3$ to diol ranging from about 0.1 to about 1.0. In order to produce a linear PECH diol, the amount of catalyst relative to the amount of epichlorohydrin preferably ranges from about 0.0005 to about 0.010 moles of catalyst per mole of epichlorohydrin.

The reaction temperature during the polymerization of the epichlorohydrin may be controlled by the rate of feed of the epichlorohydrin monomer to the reaction mass. By controlling the reaction temperature, a target average molecular weight of the PECH may be achieved. For example, a higher temperature promotes a more vigorous reaction resulting in a shorter chain PECH polyol whereas a lower reaction temperature promotes a slower reaction resulting in longer chain polymer. Preferred reaction temperatures range from about 15° to about 35° C. Higher or lower temperatures may be used, however, temperatures below about 10° C. tend to produce products having too high a molecular weight, while reaction temperatures above about 40° C. tend to produce more highly colored products.

It will be recognized by those of ordinary skill in the art that the reaction temperature may be controlled by various means such as external cooling of the reaction vessel, cooling coils in the reaction vessel, dilution of the reactants with an inert solvent and the like. The method used for controlling the reaction temperature is dependent, to a large extent, on the design of the reaction vessel and reaction cooling system available. It has been found, however, that suitable control of the reaction temperature may be obtained by the rate of addition of epichlorohydrin to the reaction mass. Hence, it is preferred to prepare the PECH polyol in the absence of solvent.

Once the PECH compound is prepared, it may be reacted as is with an organic acid, organic acid halide, organic halide, alkyl or aryl isocyanate or ester-amide selected for providing the A and $A^1$ blocks of the triblock copolymer. In general, there is no need to purify the PECH compound prior to reaction. However, if desired, the PECH compound may be purified by adding solid CaO to neutralize the catalyst and then filtering the PECH product to remove CaO as well as other solid salts from the reaction product.

When an organic acid is selected as the A block reactant, it is preferred that the acid first be converted to its acid chloride in order to reduce the occurrence of side reactions. The acid is converted to its acid chloride by reacting about one mole equivalent of acid with about one mole equivalent of $PCl_3$. The acid is dissolved in a non-polar solvent such as toluene or xylene to produce a solution having a concentration of about 5 to about 25% by weight acid. Next one mole equivalent of $PCl_3$ per mole of acid is added to the solution under a nitrogen atmosphere at room temperature. The temperature of the solution is slowly increased to a temperature ranging from about 40° to about 80° C. and maintained for a period of time ranging from about 2 to about 5 hours. When the reaction is substantially complete, the temperature of the reaction mixture is increased to above about 100° C. for about one hour in order to remove any excess $PCl_3$ from the reaction mass.

During the reaction to form the $A-B-A^1$ triblock copolymer, the A-block forming compound or compounds are dissolved in an inert organic solvent, such as toluene. The PECH compound is then added to the solution of A-block-forming compound in a ratio which preferably provides about one mole equivalent of PECH compound to about two mole equivalents of A-block forming compound. The reactants are maintained at a temperature in the range of from about 50° to about 110° C., preferably from about 70° to about 90° C., for a period of time ranging from about 2 to about 4 hours.

During the triblock formation reaction an acid scavenger such as pyridine or triethylamine is preferably added to the reaction mass to complex and remove any inorganic acid which is formed. The pyridinium or ammonium salt may be removed from the triblock copolymer product by filtration, precipitation, centrifugation, decantation and the like. The reaction mass solvent may be removed by heating the reaction product to a temperature sufficient to vaporize or distill the solvent from the reaction mass.

The molecular weight of the triblock copolymer is determined by the molecular weights of the mid block and end blocks. Typically the molecular weight will be in the range of from about 1,000 to about 5,000 daltons with a polydispersity index of from about 1.2 to about 3.0.

Solvents which may be used to conduct the tri-block formation reaction are selected from non-polar inert solvents having boiling points about 70° C. such as toluene and xylene. Halogenated solvents such as methylene chloride or chloroform may also be used. However, where the polydispersity of the product is important to the product's performance, it is preferred to avoid the use of halogenated solvents which may result in a substantial increase in polydispersity of the resulting product.

In the practice of the present invention, the surface activity or the surface hydrophilicity or wettability of a polymeric material such as a polyolefin or polystyrene is substantially increased by adding and intimately mixing therewith from about 0.1 to about 10 percent by weight based on the total weight of polymeric material, preferably from about 0.5 to about 5% by weight, of the A-B-A¹ triblock copolymer surface modifying additive. It is believed that the surface of the polymeric material exhibits increased surface activity due to the presence of the polyepichlorohydrin-based midblock of the agent adjacent the exposed surface of the polymeric material. The additive is substantially non-fugitive from the polymeric material due to the presence of polymeric material-compatible hydrocarbon end groups which anchor the tri-block in the material.

Mixing of a polymeric material and the triblock copolymer additive may be provided by any of the methods known in the art for incorporating additives into polymers. For example, the additive and polymeric material may both be dissolved in a mutually compatible solvent wherein the concentration of polymer in the solvent ranges from about 5 to about 50% by weight of the solvent. Since the additive is soluble in a wide range of solvents, a suitable solvent is selected based on the solubility of the polymer therein. For example, the additive and polypropylene may be dissolved in xylene or toluene at a temperature in the range of from about 90° to about 100° C. The solution of additive and polymer may then be dried at the same temperature to produce a cast film containing a blend of polymer and additive.

In an alternative method for blending the additive and polymer, the additive is first dissolved in a volatile solvent such as acetone to provide a solution containing from about 5 to about 50% by weight of the additive. The solution is then mixed with the polymer and the mixture dried thereby providing polymer particles which are substantially evenly coated with the additive. The coated polymer particles may then be fed to an extruder wherein the mixture is melt blended and extruded to produce an extrudate containing the polymer and additive.

The additive in liquid form may be applied directly to polymer particles by sitrring the polymer particles in the liquid additive until the additive is evenly dispersed on the surface of the polymer particles. The polymer particles containing the additive on the surface thereof may then be fed to an extruder to produce an extrudate of polymer containing the additive.

The modified polymeric materials may also be produced by submitting both the additive and solid polymeric material to an extruder followed by melting blending and extruding the molten mixture. Alternatively, the polymeric material and additive may be melt blended in a thermostatted vessel where both components are in molten form, followed by cooling of the mixture.

As the material cools, at least a portion of the additive migrates to adjacent the surface of the polymeric material thereby modifying the surface properties thereof. The additive is substantially non-fugitive from the polymeric material and, consequently, surface properties of the polymer are substantially permanently modified.

In order to facilitate a further understanding of the invention, the following non-limiting examples illustrate one or more aspects thereof.

EXAMPLE 1

Synthesis of a Polyepichlorohydrin Diol

Epichlorohydrin (ECH) was polymerized in bulk in the presence of ethylene glycol as an initiator and a $BF_3$/ethylene glycol complex as a catalyst. The reaction was conducted in a 2-liter, three-necked flask fitted with a mechanical stirrer, funnel, condenser and thermometer. The reaction was conducted while maintaining the flask in a water bath at 20° C. Epichlorohydrin was slowly added to ethylene glycol containing a complex of $BF_3$/ethylene glycol at rate of 15 to 40 grams per hour. Following the addition of epichlorohydrin, the reaction mass was held in the water bath at 20° C. for an additional 4 hours. At the end of the reaction period, 300 mL of dionized water was added into the reaction mixture with stirring to inactivate the catalyst. The organic phase in the flask was then separated from the aqueous phase and the organic phase was dried at 40° C. under vacuum for one day. The polymerization temperature was controlled by adding the epichlorohydrin to the bulk ethylene glycol containing the catalyst over a period of time in order to obtain a linear polyepichlorohydrin (PECH) diol having a relatively narrow molecular weight distribution with a polydispersity below about 1.5. The molecular weight of the PECH diol was determined by gel permeation chromatography (GPC). The weight ratios of ECH to glycol, the rate of ECH addition and the temperature of the reaction were varied to demonstrate the effect of these variables on the molecular weight of the resulting PECH. The results are listed in Table 1 below.

TABLE 1

| Sample No. | Epichlorohydrin (grams) | Ethylene glycol (grams) | Reaction Temp. (°C.) | ECH Addition Rate (g/min) | No. Average Molecular Weight (daltons) |
|---|---|---|---|---|---|
| 1 | 20 | 3.0 | 20 | 0.25 | 410 |
| 2 | 50 | 2.4 | 20 | 0.25 | 1450 |
| 3 | 50 | 1.2 | 20 | 0.25 | 2650 |
| 4 | 400 | 20.0 | 22 | 0.66 | 1430 |
| 5 | 400 | 20.0 | 22 | 0.45 | 1390 |
| 6 | 400 | 20.0 | 18 | 0.25 | 1400 |
| 7 | 50 | 0.75 | 18 | 0.25 | 4100 |
| 8 | 400 | 25 | 20 | 0.33 | 1400 |
| 9 | 400 | 25 | 25 | 1.00 | 1800[1] |
| 10 | 400 | 25 | 25 | 0.33 | 1300 |
| 11 | 400 | 25 | 30 | 0.33 | 1000[1] |
| 12 | 400 | 25 | 25 | 0.33 | 2000 |

[1]Product discolored by side reactions.

EXAMPLE 2

Synthesis of a Polyepichlorohydrin Derived Additive

An A-B-A tri-block copolymer was made by esterifying the hydroxyl end groups of the PECH diol of Sample No. 2 from Example 1 with two equivalents of tall oil rosin having a molecular weight of 302 in a 2 liter, round bottom, 3-necked flask equipped with a thermometer, stirrer, nitrogen inlet and outlet and condenser. To reduce the occurrence of side reactions, the tall oil rosin acid was first converted to the rosin acid chloride and was reacted with 2.7 grams of $PCl_3$. PECH diol, 14.5 grams, was then added into 6.7 grams of rosin acid chloride dissolved in 50 grams of toluene in a 200 mL reaction vessel. The esterification temperature was maintained at 90° C. under a nitrogen blanket. When the reaction began, about 5 grams of pyridine was added to the reaction mass as an HCl scavenger. The precipitated pyridinium hydrochloride was filtered from the reaction product solution and the solvent was removed by distilling the reaction product at 110° C. for 4 hours. The resulting A-B-A tri-block copolymer had an acid number of 5.6 mg KOH/gram of sample and a mid-block number average molecular weight of 1400. The overall molecular weight of the tri-block averaged about 2000 with a polydispersity of about 2.0.

EXAMPLE 3

Performance of the PECH Additives in Polymers

The additive of Example 2 was mixed into molten polymers of polyethylene, polypropylene, and polystyrene at concentrations ranging from 0 to 5 percent by weight. The polymers were melted in an aluminum dish at a temperature of 220° to 240° C. and the amount of additive indicated in the table was intimately mixed into the molten polymer. The mixtures of polymer and A-B-A tri-block copolymer were then melt cast onto glass microscope slides. Surface activity was measured by water droplet contact angle (sessile drop at 23°±1° C., distilled water with <0.01% aniline blue as contrast agent) at the air/polymer interface. The measured water contact angle data as a function of the concentration of surface modifying agent in the polymer are given in Table 2. The difference in the contact angle of the water droplet on a polymer containing the additive was measured against the contact angle of a water droplet on a polymer film (prepared at the same time) without the additive. Decreased water contact angle indicated increased surface activity.

TABLE 2

| Host Polymer | Host Polymer Amount (wt. %) | Tri-block copolymer (wt. %) | Water Contact Angle (degrees) |
|---|---|---|---|
| polypropylene | 100 | 0 | 94 |
| polypropylene | 99 | 1 | 83 |
| polypropylene | 98 | 2 | 79 |
| polypropylene | 95 | 5 | 79 |
| polyethylene | 100 | 0 | 93 |
| polyethylene | 99 | 1 | 83 |
| polyethylene | 98 | 2 | 79 |
| polyethylene | 95 | 5 | 70 |
| polystyrene | 100 | 0 | 93 |
| polystyrene | 99 | 1 | 78 |
| polystyrene | 98 | 2 | 75 |
| polystyrene | 95 | 5 | 67 |

All three non-polar polymers containing from 1 to 5 wt. % of the additive having a PECH diol midblock exhibited substantially decreased water contact angle as compared to the pure polymers. As the amount of additive was increased, the water contact angle decreased indicating an increase in the surface activity of the modified polymer proportional to the amount of additive in the range of 1 to 5 wt. %.

Having described and illustrated the invention and preferred embodiments thereof, it will be recognized that variations of the invention by those of ordinary skill are within the spirit and scope of the appended claims.

What is claimed is:

1. An additive for enhancing the surface energy of a polymeric material which comprises a composition comprising a triblock polymer of the formula $$A\text{-}B\text{-}A^1$$

wherein each of the A and $A^1$ blocks which may be the same or different has a number average molecular weight in the range of from about 200 to about 1000 daltons and is selected from the group consisting of units derived from dehydroabietic acid, abietic acid, dihydroabietic acid, tetrahydroabietic acid, pimaric acid, palustric acid, tall oil rosin, wood rosin, hydrogenated rosin, tall oil fatty acids, a mixture of fatty acids and derivatives and mixtures thereof and the B-block is a polyepichlorohydrin unit derived from a polyepichlorohydrin polyol (PECH polyol) having at least two terminal hydroxyl groups and having a number average molecular weight in the range of from about 400 to about 4000 daltons.

2. The additive of claim 1 wherein the A and $A^1$ blocks are the same.

3. The additive of claim 1 wherein the PECH polyol from which the B-block is derived has a number average molecular weight in the range of from about 1000 to about 2000 daltons.

4. A method for making an A-B-A triblock composition useful for enhancing the surface activity of a polymeric material which comprises halogenating a hydrophobic material selected from the group consisting of dehydroabietic acid, abietic acid, dihydroabietic acid, tetrahydroabietic acid, pimaric acid, palustric acid, tall oil rosin, wood rosin, hydrogenated rosin, tall oil fatty acids, a mixture of fatty acids and mixtures and derivatives thereof, dissolving a polyepichlorohydrin diol (PECH diol) in an organic solvent, mixing about two equivalent weights of the halogenated material with about one equivalent weight of the PECH diol solution and reacting the mixture at a temperature in the range of from about 70° to about 100° C. to form a reaction product containing the composition.

5. The method of claim 4 further comprising scavenging acid from the reaction product and separating the solvent from the reaction product.

6. The method of claim 4 wherein the hydrophobic material is selected from the group consisting of dehydroabietic acid, abietic acid, dihydroabietic acid, tetrahydroabietic acid, pimaric acid, palustric acid and derivatives and mixtures thereof.

7. The method of claim 5 wherein the hydrophobic material is tall oil rosin.

8. The method of claim 4 wherein the PECH diol from which the B-block is derived has a number average molecular weight in the range of from about 1000 to about 2000 daltons.

9. The method of claim 4 wherein the PECH diol from which the B-block is derived is a linear PECH diol.

10. The method of claim 4 wherein the hydrophobic material is a tall oil oil fatty acid or mixture of tall oil fatty acids.

* * * * *

UNITED STATES PATENT AND TRADEMARK OFFICE
CERTIFICATE OF CORRECTION

PATENT NO.    : 5,874,507
DATED         : February 23, 1999
INVENTOR(S)   : Xinya Lu and Eric S. Gardiner It is certified that error appears in the above-identified patent and that said Letters Patent is hereby corrected as shown below:

Column 2,
Line 35, insert new paragraph:
Before "According", insert -- As would be clear to anyone of ordinary skill in the art, the above disclosed "units" can alternatively be descibed as "alkyl, cycloalkyl, alkenyl, cycloalkenyl, aryl or aralkyl derivatives of one or more esters, organic acids organic halides organic acid halides, or the alkyl or aryl derivatives of isocyanates or ester amides". See United Patent 5,281,438. --

Signed and Sealed this

Eighteenth Day of September, 2001

Attest:

NICHOLAS P. GODICI
Attesting Officer    Acting Director of the United States Patent and Trademark Office